United States Patent [19]
Satoh et al.

[11] 4,399,355
[45] Aug. 16, 1983

[54] DISPLAY APPARATUS FOR TAPE RUNNING POSITIONS

[75] Inventors: Ken Satoh; Kenzi Furuta, both of Hachioji, Japan

[73] Assignee: Olympus Optical Co., Ltd., Tokyo, Japan

[21] Appl. No.: 220,236

[22] Filed: Dec. 23, 1980

Related U.S. Application Data

[63] Continuation of Ser. No. 944,062, Sep. 20, 1978, abandoned.

[30] Foreign Application Priority Data

Sep. 30, 1977 [JP] Japan .................. 52-117557

[51] Int. Cl.³ .................. G11B 15/43; G06M 3/14; H03K 27/00
[52] U.S. Cl. .................. 377/18; 242/75.51; 242/75.52; 360/72.3; 377/24
[58] Field of Search ....... 235/92 MP, 92 DN, 92 EV, 235/92 EA, 92 CC, 103, 103.5 R, 104; 360/72.1, 72.3, 73, 74.2, 90; 242/75.51, 75.52, 186, 191

[56] References Cited

U.S. PATENT DOCUMENTS

| | | | |
|---|---|---|---|
| 2,944,750 | 7/1960 | Hall | 235/103 |
| 3,564,219 | 2/1971 | Mutziger | 242/75.51 |
| 3,849,661 | 11/1974 | Beiter | 242/75.52 |
| 3,921,220 | 11/1975 | Primosch et al. | 242/191 |
| 4,001,552 | 1/1977 | Muller | 235/92 DN |
| 4,140,896 | 2/1979 | Robertson | 235/92 MP |
| 4,172,231 | 10/1979 | D'Arc et al. | 242/75.52 |
| 4,177,488 | 12/1979 | Sakai | 360/72.3 |
| 4,195,319 | 3/1980 | Ida | 360/72.3 |

*Primary Examiner*—Leo H. Boudreau

[57] ABSTRACT

A display apparatus for tape running positions is provided with a first pulse generator (36) for generating m first pulses for each revolution of a supply reel (12) in a tape transport, a second pulse generator (38) for generating n second pulses for each revolution of a take-up reel (14), and a counter (44 to 48) for counting the number of the first pulses during one period of the second pulse. The ratio of count value change in the counter for a time period from the start to the end of the tape running is expanded to the square of the change ratio of rotational speed of the reel from the beginning to the end of the tape winding. A counting range of the counter at this time is proportional to m/n.

11 Claims, 23 Drawing Figures

F I G. 11
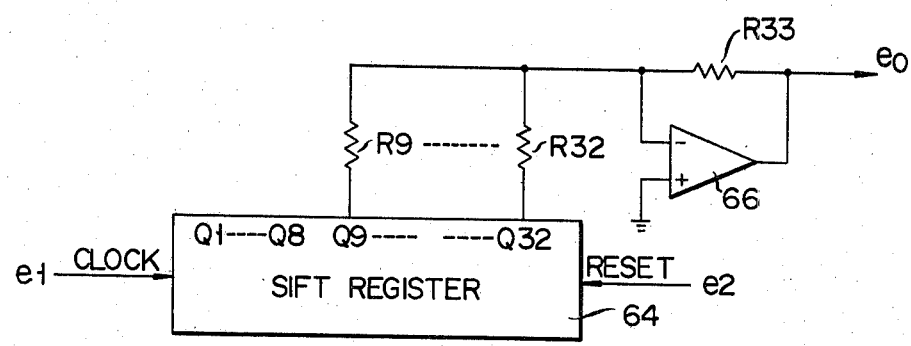
F I G. 12
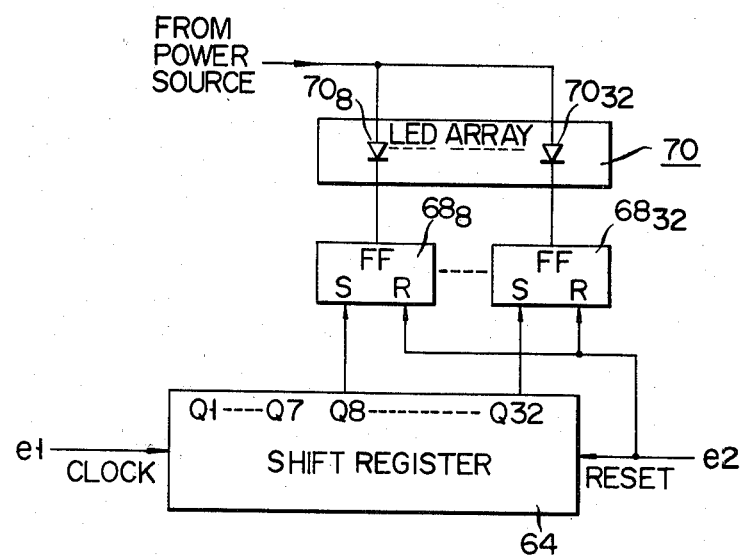

DISPLAY APPARATUS FOR TAPE RUNNING POSITIONS

This is a continuation of application Ser. No. 944,062 filed Sept. 20, 1978, now abandoned.

BACKGROUND OF THE INVENTION

The invention relates to a display apparatus for tape running positions used in tape recorders, for example.

In general, the tape recorder is provided with a counter for indicating or displaying tape running positions or an amount of tape running. Frequently, for the tape counter a mechanical tape counter is used in which a numeral corresponding to the rotational speed of a tape reel is displayed by a mechanical means. The mechanical tape counter, however, suffers from various inherent factors causing errors and is insufficient in display precision for the tape running position. One of the countermeasures against the disadvantage is a recent development of an electronic counter for displaying the tape running position by means of an electronic means. By convention, the electronic tape counter forms a signal representing the tape running position from a predetermined correlation between the rotational speeds of the capstan shaft and the take-up (or supply) reel shaft in the tape transport system. In such an electronic counter, the tape is not driven in a fast forward wind or rewind mode, so that the correlation between the capstan and reel shafts is independent of the tape running position. For this, the conventional electronic tape counter loses the function of a tape counter in the fast forward wind or rewind modes.

Further, the conventional electronic counter is defective in the tape counter precision when the tape is driven by the capstan. This arises from the fact that the ratio with respect to a change of the rotational speed of the reel shaft is small when the amount of tape taken up by the tape reel changes from zero to the maximum. The change ratio is generally 2 to 3 in a cassette type tape recorder. For example, a decimal number of three digits is assumed to be used for digitally displaying the tape running positions. In this case, at least 100 data must be taken out from the change ratio of 2 to 3. Usually, the tape base uses a thin and flexible polyester film. For this, it is very difficult to correctly take out a number of data from such a small change ratio. For example, the outer diameter of the tape when the tape of 30 m is taken up around the tape reel under a slight tension in the fast forward wind is slightly different from that when the same is taken up under a high tension in the playback. In other words, even if the lengths of the tape taken up are the same, the display numerals by the tape counter incorrectly indicate the tape length taken up, or the tape running position, because the rotational speed of the reel shaft can not be defined unconditionally. The incorrectness of the indication is more remarkable as the change ratio is smaller and the display digits are larger.

SUMMARY OF THE INVENTION

Accordingly, an object of the invention is to provide a display apparatus for tape running positions in which the tape running position can precisely be displayed even if the tape runs in any type of operation mode.

To achieve the object of the invention, there is provided a display apparatus for tape running positions comprising: a first signal generator for providing a first signal within a period corresponding to the rotational speed of a first reel in a tape transport system; a second signal generator for providing a second signal within a period corresponding to the rotational speed of a second reel in the tape transport system; and a display device for displaying the tape running position which displays the data corresponding to the number of repetitions of the first signal during one period of the second signal.

With the display apparatus for tape running positions thus constructed, a signal with the repetitive number corresponding to the tape running position may be formed from a change of the square of a change ratio with respect to the rotational speed of a tape reel from the beginning to the end of tape winding. Accordingly, the signal change corresponding to the tape running positions is great so that the display precision of the tape running position is improved. The repetitive number of the signal for displaying the tape running position is determined depending on the correlation between the amount of the tape taken up by the first reel and the amount of the tape by the second reel, and is independent of the running direction of the tape and the running speed. Therefore, even if the tape is driven in any operation mode, the display apparatus can correctly display the tape running position.

BRIEF DESCRIPTION OF THE DRAWINGS

Other objects and features of the invention will be apparent from the following description taken in connection with the accompanying drawings, in which:

FIG. 11 shows a modification of the circuit shown in FIG. 8;

FIG. 12 shows in block form a circuit construction in which the tape running position is displayed through a change in the external appearance of display marks, such as an LED display;

DESCRIPTION OF THE PREFERRED EMBODIMENTS

Figure 1:
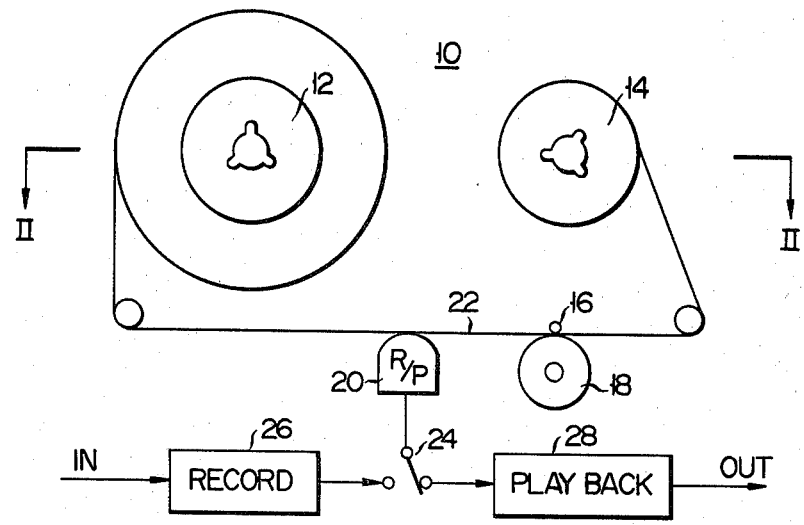
FIG. 1 shows a schematic diagram of a tape transport system of a tape recorder.

Some preferred embodiments of the invention will be described in detail with reference to FIGS. 1 to 15. Throughout the description to be given, like or similar parts or portions will be designated by like or similar reference numerals, for simplicity of explanation.

Reference is first made to FIG. 1 schematically illustrating a tape recorder. As shown, a tape transport system 10 is comprised of a supply reel 12, a take-up reel 14, a capstan 16, a pinch roller 18 and a record/playback magnetic head 20. A recording tape 22 is driven by the capstan 16 and the pinch roller 18 in a record or a playback mode and is driven by the supply reel 12 or the take-up reel 14 in a rewind or a fast forward wind mode. The head 20 is coupled with a recording amplifier 26 or a playback amplifier 28, through a switch 24.

Figure 2:
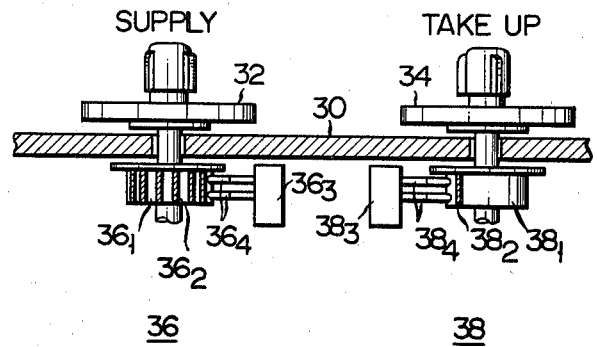
FIG. 2 shows a partial cross section of a part of the tape transport system taken on line II—II in FIG. 1.
Figure 3:
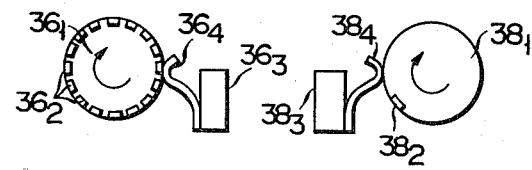
FIG. 3 shows a bottom view of the tape transport system part in FIG. 2.

FIG. 2 shows a partial cross sectional view of the tape transport system 10 taken along line II—II in FIG. 1 and FIG. 3 shows a bottom view of the tape transport system in FIG. 2. A supply reel support 32 for supporting the supply reel 12 and a take-up reel support 34 for supporting the take-up reel 14 are disposed on the top surface of a casing 30. The reel supports 32 and 34 are pivotally supported by a mechanism of the tape transport system 10 and are rotated by a motor through a rotation transfer mechanism (not shown). Coupled with the reel supports 32 and 34 are a first pulse generator 36 and a second pulse generator 38, respectively. The first pulse generator 36 has m conductive pieces $36_2$ equiangularly disposed therearound, a first rotor $36_1$ coaxially set to the reel support 32 and a first sensor $36_3$ with two slip contactors $36_4$. Similarly, the second pulse generator 38 has n conductive pieces $38_2$ equiangularly disposed therearound, a second rotor $38_1$ coaxially set to the reel support 34, and a second sensor $38_3$ with two slip contactors $38_4$. The rotors $36_1$ and $38_1$ are each made of insulating material such as acrylonitrile-butadienestyrene (ABS) resin. During one revolution, conductive pieces $36_2$ and $38_2$ will generate m and n number of pulses, respectively.

Assume now that the number m of the conductive pieces $36_2$ is 16 and the number n of the conductive pieces $38_2$ is 1. On the assumption, the first sensor $36_3$ turns on and off 16 times for each revolution of the supply reel 12 and the second sensor $38_3$ turns on and off one time for each revolution of the take-up reel 14. In other words, the first pulse generator 36 produces 16 pulses m for each revolution and the second pulse n generator 38 produces one pulse for each revolution.

Figure 4:
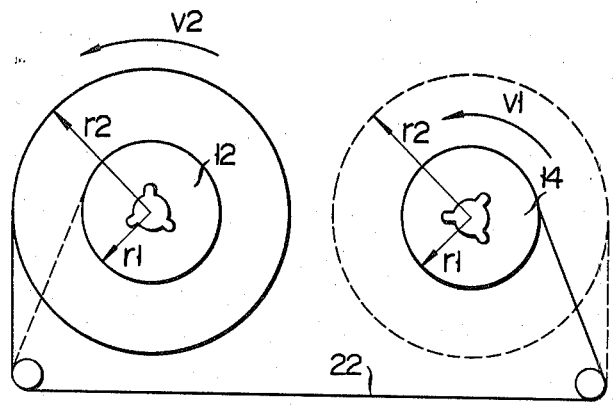
FIG. 4 schematically shows the amount of a tape taken up by a tape reel and illustrates the relationship between the radius of the tape reel and the rotational speed of the tape reel at that time.

In FIG. 4 which will now be referred to, a continuous line indicates the state in which the amount of the tape 22 taken up by the supply reel 12 is at the maximum and a broken line indicates the state in which the amount of the tape 22 taken up by the take-up reel 14 is at the maximum. In the case of a microcassette tape, the ratio of the reel radius $r_1$ when the amount of the tape taken up is zero, i.e. at the minimum, to the reel radius $r_2$ when the amount of the tape taken up is at the maximum, is approximately 1:2. For the purpose of simplification, we will proceed with the explanation on the assumption that $r_1:r_2=1:2$ and that the first pulse generator 36 produces 16 pulses for each revolution of the associated rotor and the second pulse generator 38 produces one pulse for each revolution.

Figure 5A:
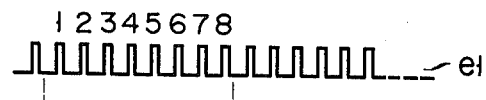
FIGS. 5A and B illustrate the time relation between pulse signals derived from pulse sensors shown in FIG. 2 at the initial stage of the tape running.
Figure 5B:
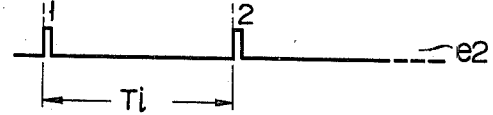
Figure 6A:
FIGS. 6A and B illustrate the time relation between pulse signals derived from pulse sensors shown in FIG. 2 at the final stage of tape running.
Figure 6B:
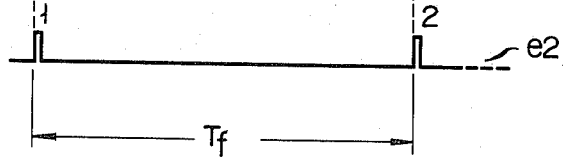

When the amount of the tape taken up by the supply reel 12 is at the maximum, the tape running position is assumed to be zero. At the initial stage of the tape running, $r_1/r_2=\frac{1}{2}$ so that the supply reel rotates half when the reel 14 revolves one time. In other words, the rotational speed $v_1$ of the take-up reel 14 is two times the rotational speed $v_2$ of the supply reel 12. Accordingly, the first pulse generator 36 produces eight first pulses $e_1$ during a period $T_i$ of the second pulse signal $e_2$ generated by the second pulse generator 38, as shown in FIGS. 5A and 5B. At the final stage of tape running, the radius of the take-up reel 14 is $r_2$ so that the supply reel 12 rotates two times when the take-up reel 14 rotates one time. That is, the number of the first pulses $e_1$ is 32 during one period $T_f$ of the second pulse signal $e_2$, as shown in FIGS. 6A and 6B.

In other words, the number of pulses in the first pulse signal $e_1$ during one period of the second pulse signal $e_2$ increases proportional to the tape running amount. Accordingly, an electronic tape counter may be constructed in such a way that the first pulse signal is counted (sampled) by using the second pulse signal $e_2$. Note here that, although the ratio of the maximum rotational speed $v_1$ of the reel 12 or 14 to the minimum rotational speed $v_2$ of the same is "2", the ratio of the maximum count (32) as a result of counting the first pulse signal $e_1$ to the minimum count (8) thereof is "4". That is to say, a conventional counter takes out the tape running position data from the pulse number change ratio of "two;" however, when the example mentioned above is used, the same data may be taken out from the ratio of "four".

Similarly, when the speed change ratio ($v_1/v_2$) of the reel is "3", the period change of the second pulse signal $e_2$ becomes "3" and the pulse number change ratio of the first pulse signal $e_1$ also becomes "3". Accordingly, the tape running position data is taken out from the signal change ratio of $3^2=9$. With designation of N for the rotational speed change of the reel, and m and n denoting the number of pulses constituting signals $e_1$ and $e_2$, respectively, the maximum and minimum counts are:

Cmax (the maximum count) = mN/n
Cmin (the minimum count) = m/nN

Therefore, the maximum change ratio of the count is $$\text{Cmax/Cmin} = mN/n/m/nN = N^2 \qquad (1)$$

The maximum change width of count is $$\text{Cmax} - \text{Cmin} = mN/n - m/nN = m/n\,(N - 1/N) \qquad (2)$$

The equation (1) indicates that, when a tape transport system permitting N times the rotational speed change of the reel is used, the tape running position data may be taken out from the signal change of $N^2$. The equation (2) shows that the resolving power or minuteness of tape running position display may be improved by using a large m/n and/or N. When a large m/n and N is used, the display precision is improved in the analogue display as well as the digital display. However, when the N is small, an error due to the extension of the tape base restricts the improvement of the display precision by making m/n large. Nevertheless, in the display apparatus according to the invention, the N is essentially expanded to $N^2$ so that the improvement of the display precision by making m/n large is better than that in the conventional display apparatus. Thus, when the counter according to the invention is used, the display precision of the tape running position is improved proportional to the square of the change ratio with respect to the rotation number of the reel shaft.

Figure 7:
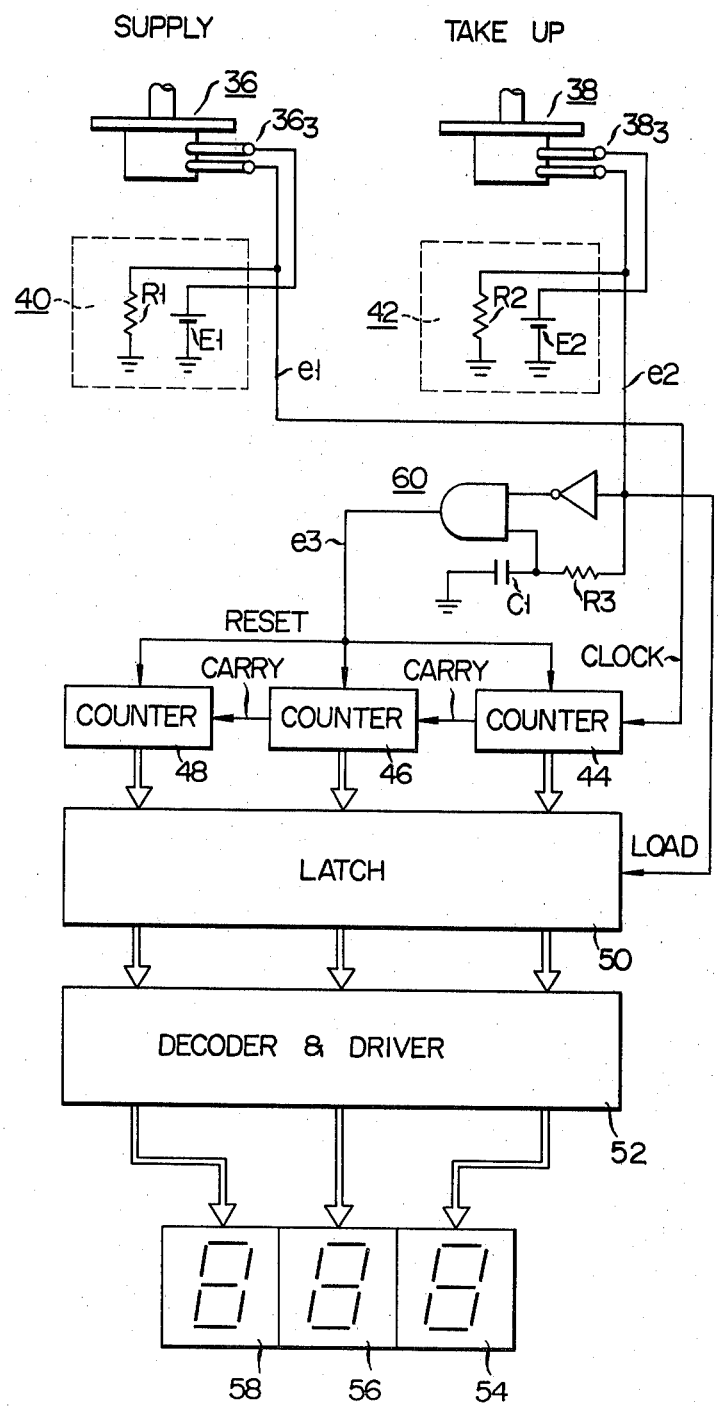
FIG. 7 shows a circuit diagram of a counter for digitally displaying tape running positions by using pulse signals derived from the pulse sensors shown in FIG. 2.

FIG. 7 shows a counter unit for digitally displaying the tape running position by using the pulse sensors 36 and 38 shown in FIG. 2. Two electrode terminals $36_3$ of the first sensor 36 are connected to the positive terminal of a DC power source E1 and one of the terminals of a load resistor R1. The negative terminal of the power source E1 and the other terminal of the resistor R1 are grounded. The power source E1 and the resistor R1 constitute a converter 40 for converting a mechanical on/off operation into a positive electric pulse. Similarly, two electrode terminals $38_3$ of the second sensor 38 are connected to a converter 42 comprised of a DC power source E2 and a load resistor R2. The converter 40 provides the positive first pulse signal $e_1$ and the converter 42 provides the positive second pulse signal $e_2$.

The first pulse signal $e_1$ is applied to a clock input terminal of a decimal counter 44. A carry signal of the counter 44 is applied to a clock input terminal of a decimal counter 46 and the carry signal of the counter 46 is applied to a clock input terminal of a decimal counter 48. The count outputs (for example, BCD code) of the counters 44 to 48 are applied to a decoder/driver 52 for a display unit of 7 segments via a latch circuit 50. The decoder/driver 52 provides data corresponding to the count output values of the counters 44 through 48 to display sections 54 through 58 each of 7 segments.

The second pulse signal $e_2$ is applied, as a load signal for controlling a temporary storing operation of the latch circuit 50, to the latch circuit 50 and also to a delay circuit 60. The second pulse signal $e_2$ is delayed by the time corresponding to a time constant $(C1 \times R3)$ included in the delay circuit 60, and is applied as a reset signal $e_3$ to the counters 44 to 48. The counters 44 to 48, after the count outputs of them are loaded into the latch circuit 50, are reset by the reset signal $e_3$.

The operation of the counter mentioned above will be described with an assumption that the number m of pulses produced by the pulse generator 36 when the reel rotates one time is 100 and the number n of pulses produced by the pulse generator 38 in the same situation is 1, that is to say, m=100 and n=1. Assume first that the contents of the counters 44 to 48 are all zero. When, upon the rotation of the take-up reel 14, the second detector $38_3$ produces a first pulse of the second pulse signal $e_2$, the contents (0, 0, 0) of the counters 44 to 48 are loaded into the latch circuit 50. Then, the display sections 54 to 58 display "0, 0, 0". When the data (0, 0, 0) is loaded into the latch circuit 50, the counters 44 to 48 are all reset and then counting of the second pulse signal $e_2$ is initiated. At this time, if the amount of the tape running is zero, it is assumed that the supply reel 12 rotates ½ when the take-up reel 14 rotates one time. If so, 50 pulses of $e_1$ are produced until the second pulse $e_2$ is produced. Accordingly, the contents of the counters 48, 46 and 44 become 0, 5 and 0. In other words, data (0, 5, 0) is loaded into the latch circuit 50 and the display sections 58, 56 and 54 display "0, 5, 0". Note here that, in the above explanation, count error of +1 inherent to the digital counter is neglected.

When the tape running amount is at the maximum, the supply reel 12 rotates two times for one rotation of the take-up reel 14. Then, the display sections 58 to 54 display "2, 0, 0". That is, in this counter, the amount of the entire tape running is divided into 150 segments for displaying the tape running positions. When it is desired that the tape running position when the tape running amount is zero is displayed by "0, 0, 0", the contents of the counters 48 and 44 are previously preset to the bit arrangement corresponding to negative data $(-0, 5, 0)$. For example, when the counters 48 to 44 produce an output of BCD code, data (1111, 1011, 0000) is preset in the counters.

Figures 8, 9C, 10C:
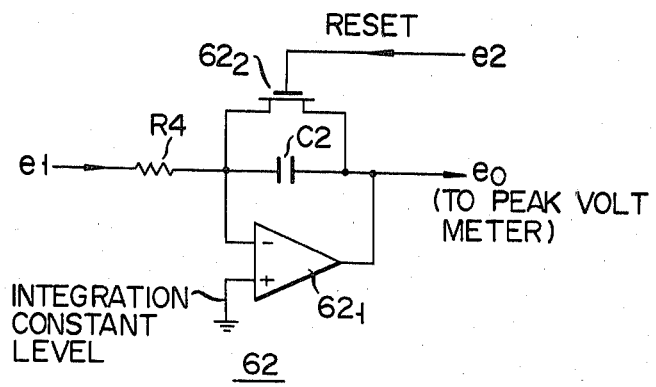
FIG. 8 shows a block diagram of an integrator for making an analogue display of a tape running position by using output pulses of converters in FIG. 7.
FIGS. 9A to C illustrate the time relation among an output signal of the integrator and the pulse signals at the initial stage of tape running.
FIGS. 10A to C illustrate the time relation among the output signal of the integrator and the pulse signals at the final stage of tape running.

Turning now to FIG. 8, there is shown a display device for displaying the tape running position in analogue form by using the pulse detectors 36 and 38 and the converters 40 and 42 shown in FIGS. 2 and 7. In this device, the first pulse signal $e_1$ is integrated by a miller integrator 62 during one period of the second pulse signal $e_2$. Specifically, the pulse $e_1$ is inputted to the inverted input terminal of an amplifier $62_1$, through a resistor R4. Between the inverted input terminal of the amplifier $62_1$ and the output terminal, is connected a capacitor C2. The source and drain terminals of a reset transistor $62_2$ are connected across the capacitor C2. An integration output $e_o$ representing the tape running position is derived from the output terminal of the amplifier $62_1$ in the form of analogue quantity. The tape running position is displayed by a peak value detecting type voltameter, for example. The potential at the non-inverted input terminal of the amplifier $62_1$ may change an integration constant level (DC component) in the integration output $e_o$. In this example, the non-inverted input terminal is grounded. The integration result, i.e. the integration output $e_o$, of the integrator 62 is reset by the pulse $e_2$. The integrator 62 may be considered as a kind of D/A converter. That is, in order to obtain a signal for indicating the tape running position, another type of D/A converter may be used.

Figure 9A:
Figure 9B:

FIGS. 9A to C show the operation of the integrator 62 at the initial stage of the tape running. As seen from the figure, during one period of the pulse $e_2$, eight positive pulses $e_1$ are integrated and a negative integration output $e_{oi}$ is produced. Here, if the DC potential at the non-inverted input terminal of the amplifier $62_1$ is set up at the peak level of the integration output $e_{oi}$, the peak level of the integration output $e_o$ at the initial stage of tape running may be made zero. In other words, when an integration constant so as to neutralize the peak value of the integration result of the pulse $e_1$ at the initial stage of tape running is set in the integrator 62, the peak level of the integration output $e_o$ corresponding to the tape running position of zero may be set zero.

Figure 10A:
Figure 10B:

FIGS. 10A to C show the operation of the integrator 62 at the final stage of tape running. During one period $T_f$ of the pulse $e_2$, 32 positive pulses of $e_f$ are integrated and a negative integration output $e_{of}$ is produced. A counter device may be constructed by assigning the integration outputs $e_{oi}$ and $e_{of}$ to 0% and 100% of the tape running positions.

FIG. 11 shows a modification of the counter device in FIG. 8. A shift register 64 is clocked by the first pulse signal $e_1$ and is reset by the second pulse signal $e_2$. The output terminals Q1 to Q8 of the shift register 64 are not used and the output terminals Q9 to Q32 are connected to the inverted input terminal of an amplifier 66, through resistors R9 to R32. The non-inverted input terminal of the amplifier 66 is grounded and the inverted input terminal is connected to the output terminal of the amplifier 66, through a resistor R33. An analogue output signal $e_o$ representing the tape running position is derived from the output terminal of the amplifier 66. If the amplification degree of the amplifier 66 is sufficiently large, the output signal $e_o$ is given $$e_o \sim -R_{33}/R_i \times E_s \qquad (3)$$

In the equation (3), $i = 9$ to 32 and $E_s$ corresponds to a high level potential at the output terminal of the shift register 64. If the resistors R9 to R32 are related R9 > R10 > ... > R32, the magnitude of the signal $e_o$ is larger as the number of pulses of $e_1$ produced for a period of the pulse $e_2$ are larger.

The reason why the output terminals Q1 to Q8 of the shift register 64 are not used is given below. When the tape running position is zero, the pulse $e_1$ is produced, eight pulses, as shown in FIGS. 9A and B. At this time, if the display unit displays zero, the potential of the signal $e_o$ is preferably zero. Therefore, the output terminals Q1 to Q8 are separated from the amplifier 66. When nine pulses of $e_1$ appear during one period of the pulse signal $e_2$, the output terminal Q9 of the shift register 64 becomes high in level. The potential of the signal $e_o$ is expressed by $e_o \sim -(R_{33}/R_9) \times E_s$ as seen from the equation (3). When the tape running position is at the maximum, 32 pulses of $e_1$ are produced as shown in FIGS. 10A to B. Then, immediately before the shift register 64 is reset, the output terminal Q32 becomes high in level and the potential $e_o$ is expressed by $e_o \sim -(R_{33}/R_{32})E_s$. That is, the potential of the signal $e_o$ stepwisely changes in accordance with the output from the shift register 64.

As seen from the equation (3), the potential of $e_o$ may be set any value by appropriately selecting the resistances of the resistors R9 to R32. By appropriately forming a resistance distribution in the group of the resistors R9 to R32, a relation between the tape running amount and the display value in the counter device may be voluntarily set up.

FIG. 12 shows a modification of the counter unit in FIG. 7. The output terminals Q8 to Q32 of a shift register 64 are connected to the set input terminals of set/reset flip-flops $68_8$ to $68_{32}$, respectively. The flip-flops $68_8$ to $68_{32}$ and the shift register 64 are together reset by the pulse $e_2$. The output terminals of the flip-flops $68_8$ to $68_{32}$ are connected to LEDs $70_8$ to $70_{32}$ of a LED array 70, respectively. The LEDs $70_8$ to $70_{32}$ form various symbols such as characters and/or numerals, or form points arranged as a straight line. At the initial stage of tape running, when eight pulses of $e_1$ are loaded into the shift register 64 during one period of the pulse signal $e_2$, the output terminal Q8 becomes high in level. As a result, the flip-flop $68_8$ is set to energize the LED $70_8$. Lighting of only the LED $70_8$ corresponds to the tape running position "0". When 9 pulses of $e_1$ appear during one period of the pulse $e_2$, the flip-flops $68_8$ and $68_9$ are set and the LEDs $70_8$ to $70_9$ are energized. Similarly, at the final stage of tape running, when 32 pulses of $e_1$ take place during one period of the pulse $e_2$, the flip-flops $68_8$ to $68_{32}$ are all set, and then the LEDs $70_8$ to $70_{32}$ are lit. The lighting of the LED array 70 is repeated corresponding to the period of the pulse $e_2$ and its lighting state indicates the tape running position.

Although not shown, the flip-flops 68 may be omitted in the embodiment in FIG. 12. In this case, when any one of the output terminals Q8 to Q32 of the shift register 64 is high, only one LED connected to the high level output terminal is energized to light up.

Figure 12A:
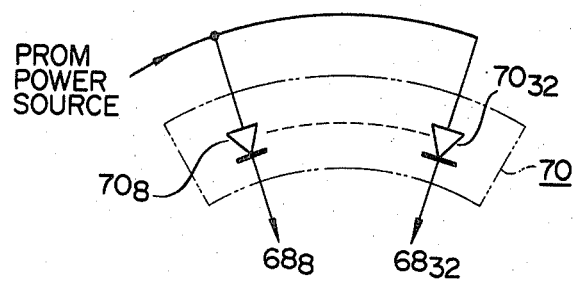
FIGS. 12A and 12B show modifications of the LED array of FIG. 12.
Figure 12B:
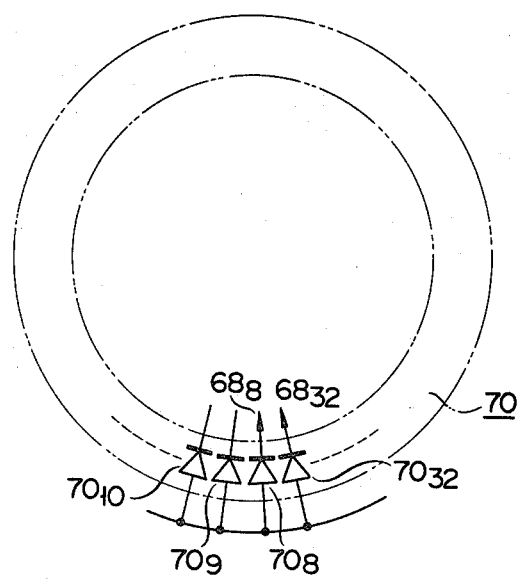
Figure 13:
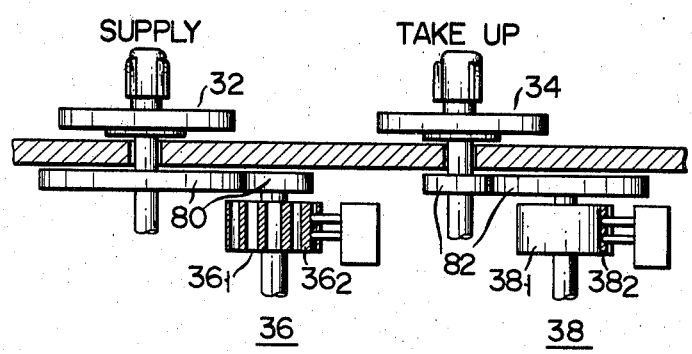
FIG. 13 shows a modification of the construction in FIG. 2 in which rotational speed change mechanisms are provided between reel supports and pulse generators, respectively.

The LED array 70 and the 7 segments display devices 54 to 58 may be replaced by a liquid crystal display device or any other suitable ones. The arrangement of the LEDs $70_8$ to $70_{32}$ is not limited to a straight fashion but may take any type of configuration, such as a ring or a spiral form as illustrated in FIGS. 12A and 12B.

A rotation speed change mechanism may be provided at the coupling portion between the pulse generator 36 and the reel support 32, and between the pulse generator 38 and the reel support 34. For example, the first rotor $36_1$ is coupled with the reel support 32 through a gear mechanism 80 with the speed ratio 1:3. If so constructed, the rotor $36_1$ rotates three times for each rotation of the reel support 32. Therefore, provision of such an over-drive gear mechanism increases the number of the conductor pieces $36_2$ equivalently three times. Further, when the rotor $38_1$ is coupled with the reel support 34 through a gear mechanism 82 with the speed ratio 2:5, the rotor $38_1$ rotates two times for every five rotations of the reel support 34. With such a reduction gear mechanism, the number of the conductive pieces $38_2$ is reduced equivalently 2/5. As described above, the ratio m/n may be changed by using the overdrive gear mechanism and/or the reduction gear mechanism. In addition to these mechanisms, a belt transmission or an idler wheel mechanism may be used.

Figure 14:
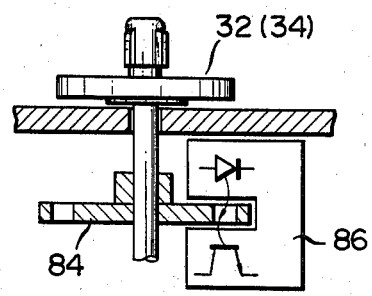
FIGS. 14 and 15 show modifications of pulse generators shown in FIG. 2.
Figure 15:
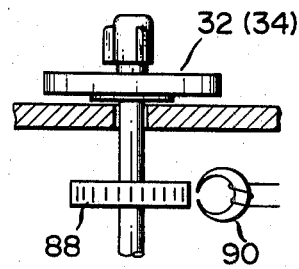

For the pulse generators 36 and 38, electric switches as shown in FIGS. 14 and 15 may be used in place in the mechanical switches mentioned above. In the example shown in FIG. 14, a photo-interrupter 86 is used in which an optical path is interrupted by a disc 84 with holes which rotates interlocking with the reel support 32 or 34. In the case of FIG. 15, a magnetic disc 88 and a magnetic head 90 are used. The magnetic disc 88 rotates interlocking with the reel support 32 or 34 and is provided around the periphery with magnetic pulses recorded. The magnetic head 90 detects the magnetic pulses. A semiconductor Hall element may be used for the magnetic head 90.

Although specific circuit constructions have been illustrated and described herein, it is not intended that the invention be limited to the elements and circuit constructions disclosed. One skilled in the art will recognize that the particular elements or subcircuits may be used without departing from the scope and spirit of the invention.

What we claim is:

1. A display apparatus for tape running positions comprising:
   a tape transport system in which the rotational speeds of first and second reels vary according to an amount of running of a tape;
   first generator means connected to said first reel for generating m number of pulses constituting a first signal for each revolution of said first reel;
   second signal generator means connected to said second reel for generating n number of pulses constituting a second signal for each revolution of said second reel;
   counter means connected to said first and second signal generator means for counting the repetitive pulse number of said first signal appearing during one cycle period of said second signal, the count operation of said counter means being carried out so that $$C_{max} - C_{min} = m/n \ (N - 1/N)$$

where

Cmax denotes a maximum count of the repetitive pulse number of said first signal appearing during one cycle period of said second signal, Cmin a minimum count thereof, and N a rotational speed change of said first and second reels;

display means connected to said counter means for displaying an amount of running of the tape according to count data obtained from the count operation of said counter means;

a shift register connected to said first and second signal generator means and adapted to be clocked by said first signal and reset by said second signal; and a display array including display elements connected to output terminals of said shift register in which the energizing state of said display elements varies according to an amount of running of the tape.

2. A display apparatus according to claim 1, further comprising means connected, in order to increase a ratio m/n of the pulse number m of said first signal to the pulse number n of said second signal, between said first reel and said first signal generator means for providing a higher rotational speed than that of said first reel.

3. A display apparatus according to claim 1, further comprising means connected, in order to increase a ratio m/n of the pulse number m of said first signal to the pulse number n of said second signal, between said second reel and said second signal generator means for providing a lower rotational speed than that of said second reel.

4. A display apparatus according to claim 1 further comprising set/reset flip-flops connected at the set input terminals to output terminals of said shift register, adapted to receive said second signal at the reset input terminals and connected at the output terminals to said display elements, respectively, so that the energizing number of said display elements is increased as an amount of running of the tape increases.

5. A display apparatus according to claim 1, wherein, in order to indicate a tape running position at an initial stage of the running of the tape, predetermined output terminals of said shift register are unconnected to said display elements.

6. A display apparatus according to claim 1, wherein said display elements are arranged in a straight line array.

7. A display apparatus according to claim 1, wherein said display elements are arranged in a curved form.

8. A display apparatus according to claim 1, wherein said display elements are arranged in a ring array.

9. A display apparatus for tape running positions comprising:

a tape transport system in which the rotational speeds of first and second reels vary according to an amount of running of the tape;

first signal generator means connected to said first reel for generating pulses constituting a first signal for each revolution of said first reel;

second signal generator means connected to said second reel for generating pulses constituting a second signal for each revolution of said second reel;

a Miller integrator connected to said first and second signal generator means for integrating said first signal appearing during one cycle period of said second signal, said Miller integrator being reset by said second signal and a maximum level of an integration output being displayed by a display device which is applied to said Miller integrator.

10. A display apparatus according to claim 9, wherein an integrating constant is beforehand set in said integrator at an initial stage of the running of the tape so as to neutralize said integration output corresponding to said first signal.

11. A display apparatus for tape running positions comprising:

a tape transport system in which the rotational speeds of first and second reels vary according to an amount of running of a tape;

first signal generator means connected to said first reel for generating pulses constituting a first signal for each revolution of said first reel;

second signal generator means connected to said second reel for generating pulses constituting a second signal for each revolution of said second reel;

a shift register connected to said first and second signal generator means for producing a shift pulse and adapted to be clocked by said first signal and reset by said second signal; and a converter connected to output terminals of said shift register for receiving shift pulses appearing at the output terminals of said shift register and for producing an output signal whose level varies in a staircase fashion depending on the clocked state of said shift register, said output signal being displayed by a display device which is applied to said converter, wherein, in order to indicate a tape running position at an initial stage of the running of the tape, predetermined output terminals of said shift register are unconnected to said converter.

* * * * *